United States Patent
McFadden et al.

(10) Patent No.: US 7,886,658 B2
(45) Date of Patent: Feb. 15, 2011

(54) SPEED COOKING OVEN WITH IMPROVED RADIANT MODE

(75) Inventors: David H. McFadden, Lexington, MA (US); David A. Bolton, Southlake, TX (US)

(73) Assignee: Turbochef Technologies, Inc., Atlanta, GA (US)

( * ) Notice: Subject to any disclaimer, the term of this patent is extended or adjusted under 35 U.S.C. 154(b) by 762 days.

(21) Appl. No.: 11/928,084

(22) Filed: Oct. 30, 2007

(65) Prior Publication Data

US 2008/0105133 A1 May 8, 2008

Related U.S. Application Data

(63) Continuation-in-part of application No. 11/098,280, filed on Apr. 4, 2005, now Pat. No. 7,360,533, and a continuation-in-part of application No. 10/614,268, filed on Jul. 7, 2003, and a continuation-in-part of application No. 10/614,532, filed on Jul. 7, 2003, and a continuation-in-part of application No. 11/392,050, filed on Mar. 29, 2006.

(51) Int. Cl.
*H05B 6/70* (2006.01)
*H05B 6/80* (2006.01)
*A21B 1/26* (2006.01)

(52) U.S. Cl. .................... 99/476; 99/480; 126/21 A; 126/273 R; 219/681; 219/696; 219/746; 219/400

(58) Field of Classification Search .......... 99/474, 99/475, 476, 480; 126/21 A, 273 R; 219/681, 219/682, 685, 400, 401, 696, 746, 751
See application file for complete search history.

(56) References Cited

U.S. PATENT DOCUMENTS 2,563,253 A 8/1951 Levin
(Continued)

FOREIGN PATENT DOCUMENTS

CN 2348616 11/1999
(Continued)

OTHER PUBLICATIONS

Office Action dated Apr. 14, 2009 in related U.S. Appl. No. 10/614,532.
(Continued)

*Primary Examiner*—Reginald L Alexander
(74) *Attorney, Agent, or Firm*—Dean W. Russell; Kristin M. Crall; Kilpatrick Townsend & Stockton LLP

(57) ABSTRACT

A speed cooking with improved gas flow by-pass mechanism for radiant cooking mode. A speed cooking oven with radiant mode is disclosed comprising a cooking cavity, a controller, thermal heating source, blower assembly, air directing means, a vent assembly and a single door gas by-pass system. Hot gas is circulated by the blower motor assembly into the oven cavity where the hot air is directed in a manner wherein a conflicting, colliding turbulent gas flow is directed at a food product providing for the rapid cooking of food products. Alternatively, a single movable door may be utilized that operates between an open position wherein gas flow exhausts from the top of the oven or in the closed position wherein gas is diverted through a conduit and back to the blower mechanism. Gas may therefore flow into the oven cooking cavity or may be diverted around the cooking cavity and maintained at the same temperature, lower temperature or elevated temperature as compared to the cooking cavity without having a direct effect on the food product being cooked.

11 Claims, 4 Drawing Sheets

U.S. PATENT DOCUMENTS

| | | | |
|---|---|---|---|
| 2,704,802 A | 3/1955 | Blass et al. | |
| 3,210,511 A | 10/1965 | Smith | |
| 3,548,152 A | 12/1970 | Klepzig | |
| 3,581,038 A | 5/1971 | Williams | |
| 3,813,216 A | 5/1974 | Baur et al. | |
| 3,828,760 A | 8/1974 | Farber et al. | |
| 3,973,551 A | 8/1976 | Caselani et al. | |
| 4,154,861 A | 5/1979 | Smith | |
| 4,160,144 A | 7/1979 | Kashyap et al. | |
| 4,160,145 A | 7/1979 | Rueggeberg | |
| 4,283,614 A | 8/1981 | Tanaka et al. | |
| 4,316,069 A | 2/1982 | Fitzmayer | |
| 4,327,279 A | 4/1982 | Guibert | |
| 4,332,992 A * | 6/1982 | Larsen et al. | 219/681 |
| 4,337,384 A | 6/1982 | Tanaka et al. | |
| 4,338,911 A | 7/1982 | Smith | |
| 4,350,504 A | 9/1982 | Diachuk | |
| 4,354,083 A | 10/1982 | Staats | |
| 4,403,128 A | 9/1983 | Takagi et al. | |
| 4,409,453 A | 10/1983 | Smith | |
| 4,431,889 A | 2/1984 | Saponara et al. | |
| 4,464,554 A | 8/1984 | Bakanowski et al. | |
| 4,480,164 A | 10/1984 | Dills | |
| 4,494,525 A | 1/1985 | Albertsen | |
| 4,737,373 A | 4/1988 | Forney | |
| 4,752,268 A | 6/1988 | Kataoka et al. | |
| 4,786,774 A | 11/1988 | Kaminaka | |
| 4,831,238 A * | 5/1989 | Smith et al. | 219/400 |
| 4,849,597 A | 7/1989 | Waigand | |
| 4,913,223 A * | 4/1990 | Mizuno et al. | 165/61 |
| 4,924,763 A | 5/1990 | Bingham | |
| 4,949,629 A | 8/1990 | Leary et al. | |
| 4,958,412 A | 9/1990 | Stanek | |
| 4,965,435 A | 10/1990 | Smith et al. | |
| 5,025,775 A | 6/1991 | Crisp | |
| 5,161,889 A | 11/1992 | Smith et al. | |
| 5,166,487 A | 11/1992 | Hurley et al. | |
| 5,204,503 A | 4/1993 | Maiellano et al. | |
| 5,277,105 A | 1/1994 | Bruno | |
| 5,369,250 A | 11/1994 | Meredith | |
| 5,401,940 A | 3/1995 | Smith et al. | |
| 5,555,795 A | 9/1996 | Tsai | |
| 5,676,870 A | 10/1997 | Wassman et al. | |
| 5,717,192 A | 2/1998 | Dobie et al. | |
| 5,825,000 A | 10/1998 | Jun | |
| 5,826,496 A | 10/1998 | Jara | |
| 5,927,265 A | 7/1999 | McKee et al. | |
| 5,934,178 A | 8/1999 | Caridis et al. | |
| 5,994,672 A | 11/1999 | Mestnik | |
| 6,012,442 A | 1/2000 | Faraj | |
| 6,058,924 A | 5/2000 | Pool et al. | |
| 6,060,701 A | 5/2000 | McKee et al. | |
| 6,114,664 A | 9/2000 | Cook et al. | |
| 6,140,626 A * | 10/2000 | McKee et al. | 219/681 |
| 6,250,296 B1 | 6/2001 | Norris et al. | |
| 6,369,360 B1 | 4/2002 | Cook | |
| 6,376,817 B1 | 4/2002 | McFadden | |
| 6,399,930 B2 | 6/2002 | Day et al. | |
| 6,403,937 B1 | 6/2002 | Day et al. | |
| 6,437,303 B1 | 8/2002 | Dorr et al. | |
| 6,472,640 B2 | 10/2002 | Brown et al. | |
| 6,472,647 B2 | 10/2002 | Lee et al. | |
| 6,481,999 B2 | 11/2002 | Knost | |
| 6,655,373 B1 | 3/2004 | Miller | |
| 6,712,063 B1 | 3/2004 | Thorneywork | |
| 6,713,741 B2 | 3/2004 | Miller | |
| 6,874,495 B2 | 4/2005 | McFadden | |
| 6,909,078 B2 | 6/2005 | Lee et al. | |
| 7,055,518 B2 | 6/2006 | McFadden | |
| 7,087,872 B1 | 8/2006 | Dobie et al. | |
| 7,360,533 B2 | 4/2008 | McFadden | |
| 7,507,938 B2 | 3/2009 | McFadden | |
| 2001/0054605 A1 | 12/2001 | Suzuki et al. | |
| 2002/0179588 A1 | 12/2002 | Lubrina et al. | |
| 2003/0226452 A1 | 12/2003 | Artt | |
| 2004/0118392 A1 | 6/2004 | McFadden | |
| 2004/0123858 A1 | 7/2004 | McFadden | |
| 2004/0200828 A1 | 10/2004 | Becker et al. | |
| 2004/0211765 A1 | 10/2004 | McFadden | |
| 2004/0216732 A1 | 11/2004 | McFadden | |
| 2005/0217503 A1 | 10/2005 | McFadden | |
| 2006/0169272 A1 | 8/2006 | McFadden et al. | |
| 2007/0137633 A1 | 6/2007 | McFadden | |
| 2007/0194011 A1 | 8/2007 | McFadden | |
| 2007/0295322 A1 | 12/2007 | Dobie et al. | |
| 2008/0099008 A1 | 5/2008 | Bolton et al. | |
| 2008/0105133 A1 | 5/2008 | McFadden et al. | |
| 2008/0105135 A1 | 5/2008 | McFadden et al. | |
| 2008/0105136 A1 | 5/2008 | McFadden | |
| 2008/0105249 A1 | 5/2008 | McFadden et al. | |
| 2008/0106483 A1 | 5/2008 | McFadden et al. | |
| 2008/0206420 A1 | 8/2008 | McFadden | |
| 2008/0216812 A1 | 9/2008 | McFadden | |
| 2008/0296284 A1 | 12/2008 | McFadden | |

FOREIGN PATENT DOCUMENTS

| | | |
|---|---|---|
| DE | 2557867 | 6/1977 |
| DE | 3119596 A1 | 12/1982 |
| DE | 8801849 U1 | 3/1988 |
| DE | 3734958 A1 | 4/1989 |
| EP | 0 096 159 | 12/1983 |
| EP | 0429822 | 6/1991 |
| EP | 0429822 A1 | 6/1991 |
| EP | 0534787 A1 | 3/1993 |
| GB | 2 043 237 | 10/1980 |
| GB | 2043237 | 10/1980 |
| JP | 62218736 A | 9/1987 |
| JP | 63-317068 | 12/1988 |
| WO | WO 9836619 | 8/1998 |
| WO | WO 2004/014139 | 2/2004 |
| WO | WO 2005/041672 | 5/2005 |
| WO | WO 2005/087009 | 9/2005 |
| WO | WO 2006/041814 | 4/2006 |
| WO | WO 2006/081202 | 8/2006 |
| WO | WO 2006/099394 | 9/2006 |
| WO | WO2009058934 | 5/2009 |

OTHER PUBLICATIONS

Response dated Jul. 7, 2009 in related U.S. Appl. No. 10/614,532.
Response dated Jan. 23, 2009 in related U.S. Appl. No. 10/614,268.
Office Action dated Apr. 28, 2009 in related U.S. Appl. No. 10/614,268.
Response dated Jul. 7, 2009 in related U.S. Appl. No. 10/614,268.
Office Action dated Apr. 15, 2009 in related U.S. Appl. No. 11/392,050.
Response dated Jul. 7, 2009 in related U.S. Appl. No. 11/392,050.
Office Action dated Apr. 15, 2009 in related U.S. Appl. No. 10/591,074.
Abstract JP2000254001, published Mar. 8, 1999.
International Search Report and Written Opinion dated Feb. 11, 2009 in related Application No. PCT/US2008/081689.
Rueggeberg, 'A Multislotted Waveguide Antenna for High-Powered Microwave Heating Systems,' IEEE Transactions on Industry Applications, IA-16(6):809-813 (1980).
Supplementary Search Report dated Mar. 4, 2009 in related European Application No. 04816933.
Response dated Dec. 17, 2008 in related U.S. Appl. No. 10/591,074.
Response dated Jan. 16, 2009 in related U.S. Appl. No. 11/392,050.
Response dated Jan. 16, 2009 in related U.S. Appl. No. 10/614,532.
Office Action dated Feb. 5, 2009 in related U.S. Appl. No. 11/928,063.
Response dated Nov. 13, 2008 in related U.S. Appl. No. 11/663,253.

Office Action dated Mar. 18, 2009 in related U.S. Appl. No. 11/663,253.
U.S. Appl. No. 11/908,169, filed Sep. 10, 2007, McFadden.
U.S. Appl. No. 11/928,037, filed Oct. 30, 2007, McFadden.
U.S. Appl. No. 12/045,063, filed Mar. 10, 2008, Dougherty.
Response dated Aug. 4, 2009 in related U.S. Appl. No. 11/928,063.
Office Action dated Jul. 15, 2009 in related U.S. Appl. No. 11/908,169.
Office Action dated Jul. 23, 2009 in related U.S. Appl. No. 11/928,007.
Response dated Jul. 21, 2009 in related U.S. Appl. No. 11/663,253.
Office Action dated Oct. 3, 2008 in related U.S. Appl. No. 10/591,074.
Office Action dated Aug. 19, 2008 in related U.S. Appl. No. 11/663,253.
Office Action dated May 30, 2007 in related U.S. Appl. No. 10/614,268.
Response dated Nov. 30, 2007 in related U.S. Appl. No. 10/614,268.
Office Action dated Feb. 4, 2008 in related U.S. Appl. No. 10/614,268.
Response dated Aug. 4, 2008 in related U.S. Appl. No. 10/614,268.
Office Action dated Aug. 13, 2007 in related U.S. Appl. No. 10/576,847.
Response dated Feb. 12, 2008 in related U.S. Appl. No. 10/576,847.
Office Action dated Apr. 24, 2008 in related U.S. Appl. No. 10/576,847.
Response dated Oct. 7, 2008 in related U.S. Appl. No. 10/576,847.
Office Action dated Sep. 4, 2007 in related U.S. Appl. No. 11/392,050.
Response dated Mar. 6, 2008 in related U.S. Appl. No. 11/392,050.
Office Action dated Jul. 22, 2008 in related U.S. Appl. No. 11/392,050.
Office Action dated Jan. 25, 2005 in related U.S. Appl. No. 10/614,532.
Response dated Jun. 27, 2005 in related U.S. Appl. No. 10/614,532.
Office Action dated Sep. 22, 2005 in related U.S. Appl. No. 10/614,532.
Response dated Mar. 22, 2006 in related U.S. Appl. No. 10/614,532.
Office Action dated Apr. 7, 2006 in related U.S. Appl. No. 10/614,532.
Response dated Oct. 10, 2006 in related U.S. Appl. No. 10/614,532.
Office Action dated Jan. 11, 2007 in related U.S. Appl. No. 10/614,532.
Response dated Jul. 11, 2007 in related U.S. Appl. No. 10/614,532.
Office Action dated Sep. 27, 2007 in related U.S. Appl. No. 10/614,532.
Response dated Mar. 27, 2008 in related U.S. Appl. No. 10/614,532.
Office Action dated Jul. 23, 2008 in related U.S. Appl. No. 10/614,532.

* cited by examiner

US 7,886,658 B2

SPEED COOKING OVEN WITH IMPROVED RADIANT MODE

CROSS REFERENCE TO RELATED APPLICATIONS

The present application claims priority to International Application No. PCT/US2005/035605 filed 5 Oct. 2005; claims priority to U.S. application Ser. No. 11/098,280 filed 4 Apr. 2005; claims priority to International Application No. PCT/US2006/009075 filed 14 Mar. 2006 and claims priority to U.S. application Ser. No. 11/392,050 filed 29 Mar. 2006. Upon entry into the National Stage in the United States of America, the present application will be a continuation-in-part of U.S. application Ser. No. 11/098,280 filed 4 Apr. 2005 now U.S. Pat. No. 7,360,533; will be a continuation-in-part of U.S. application Ser. No. 10/614,268 filed 7 Jul. 2003, pending; will be a continuation-in-part of U.S. application Ser. No. 10/614,532 filed 7 Jul. 2003, pending; and will be a continuation-in-part of U.S. application Ser. No. 11/392,050 filed 29 Mar. 2006, pending.

The present application contains technical disclosure in common with International Application No. PCT/US2003/021225 filed 5 Jul. 2003; contains technical disclosure in common with International Application No. PCT/US2005/007261 filed 7 Mar. 2005; contains technical disclosure in common with U.S. Provisional Application No. 60/394,216 filed 5 Jul. 2002; contains technical disclosure in common with PCT/US2004/035252 filed 21 Oct. 2004; contains technical disclosure in common with International Application No. PCT/US2005/035605 filed 5 Oct. 2005, contains technical disclosure in common with International Application No. PCT/US2006/009075 filed 14 Mar. 2006, contains technical disclosure in common with U.S. Provisional Application No. 60/513,110 filed 21 Oct. 2003; contains technical disclosure in common with U.S. Provisional Application No. 60/513,111 filed 23 Oct. 2003; contains technical disclosure in common with U.S. Provisional Application No. 60/614,877 filed 30 Sep. 2004; contains technical disclosure in common with U.S. Provisional Application No. 60/551,268 filed 8 Mar. 2004; contains technical disclosure in common with U.S. Provisional Application No. 60/615,888 filed 5 Oct. 2004; and contains technical disclosure in common with U.S. Provisional Application No. 60/550,578 filed 5 Mar. 2004.

All of the applications set forth above are incorporated herein by reference as if fully set forth.

FIELD OF THE INVENTION

The present invention relates to re-circulating speed cooking ovens with a simplified mechanical mechanism to allow for a radiant mode wherein gas flow may be heated or cooled without directly affecting a food product that may be cooking during such heat up or cool down of the gas flow.

SUMMARY OF THE INVENTION

This invention relates to ovens for cooking of food products. In particular, this invention combines the ability to cook a food product while at the same time providing an improved by-pass mechanism for increasing or decreasing the temperature of the gas flow without directly affecting the food product in the oven cavity. Currently, it is a requirement that in order to increase or decrease the temperature of gas flow available for cooking, a food product being cooked will be impacted by such heat up or cool down of the gas flow. The invention allows for gas flow circulation around the oven cavity without flowing to the food product within the oven cavity.

Additional objects, features and advantages of the present invention will become readily apparent from the following detailed description of the exemplary embodiment thereof, when taken in conjunction with the drawings wherein like reference numerals refer to corresponding parts in the several views.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
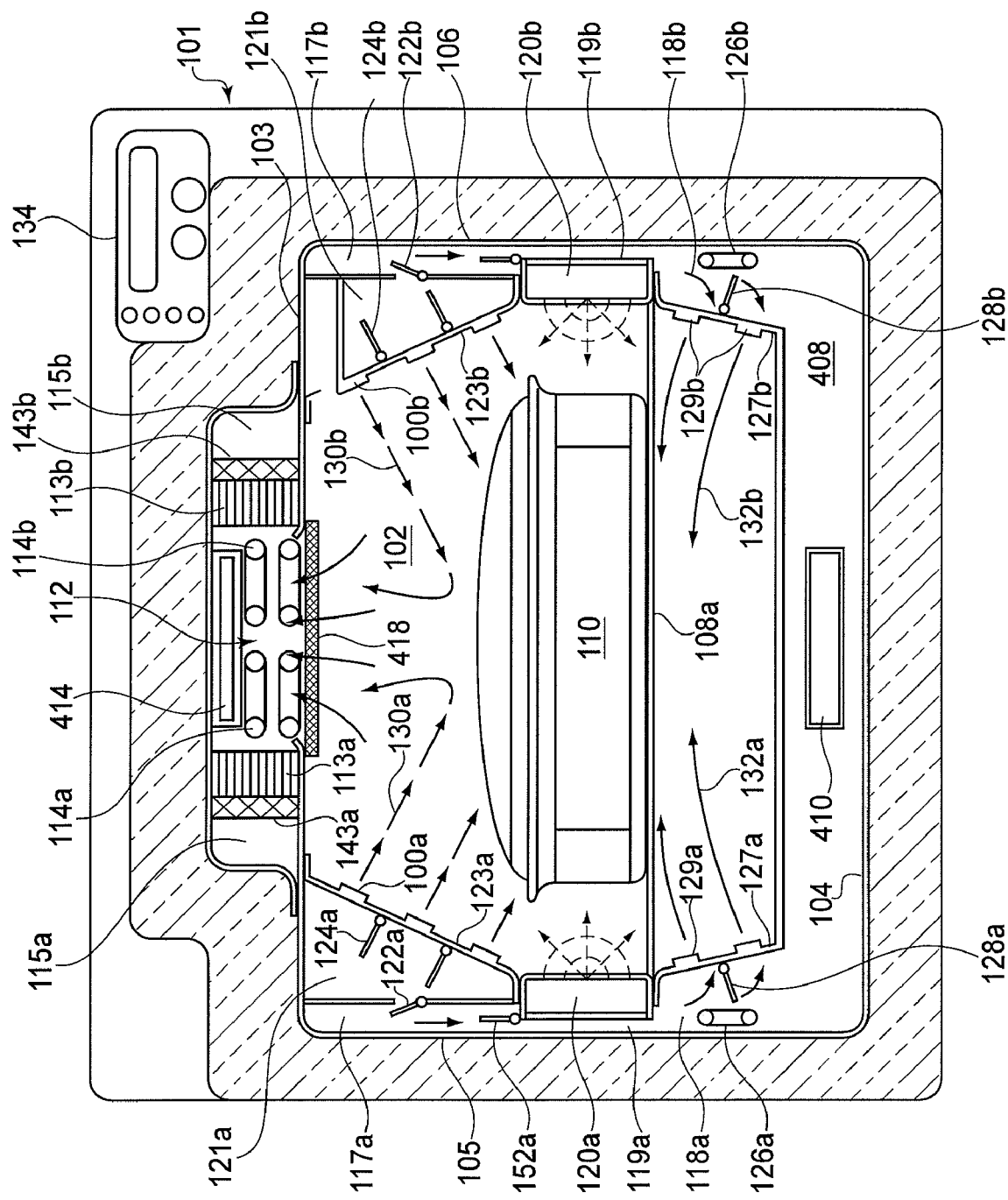
FIG. 1 is a front view of the oven with improved by-pass valve in normally open position.

An exemplary version of the speed cook oven with radiant mode is shown in FIGS. 1-4. Appliance 101 includes an oven cavity 102 generally defined by a top wall 103, a bottom wall 104, left side wall 105, right side wall 106, a back wall 194 and a front wall 195. Oven cavity 102 also has associated therewith an access opening 107 through which food items 110 may be placed within oven cavity 102 upon cooking rack 108a, FIG. 1. Although shown as an oven with one rack 108a, the invention may be practiced wherein multiple racks are utilized and although rack 108a is shown as a free-standing cooking rack, it may also be supported by the oven side walls. Cooking appliance 101 has a hinged door 109 pivotally attached to the oven front for closing the cooking section opening 107 during cooking operation. Hinged door 109 may be swung between an open position wherein the door allows access to oven cavity 102 and a closed position wherein the door covers the opening into oven cavity 102. Although illustrated as a hinged door pivotally attached at the left side of the front of the oven, the door may be hinged on the right side, bottom side or top side.

Figure 2:
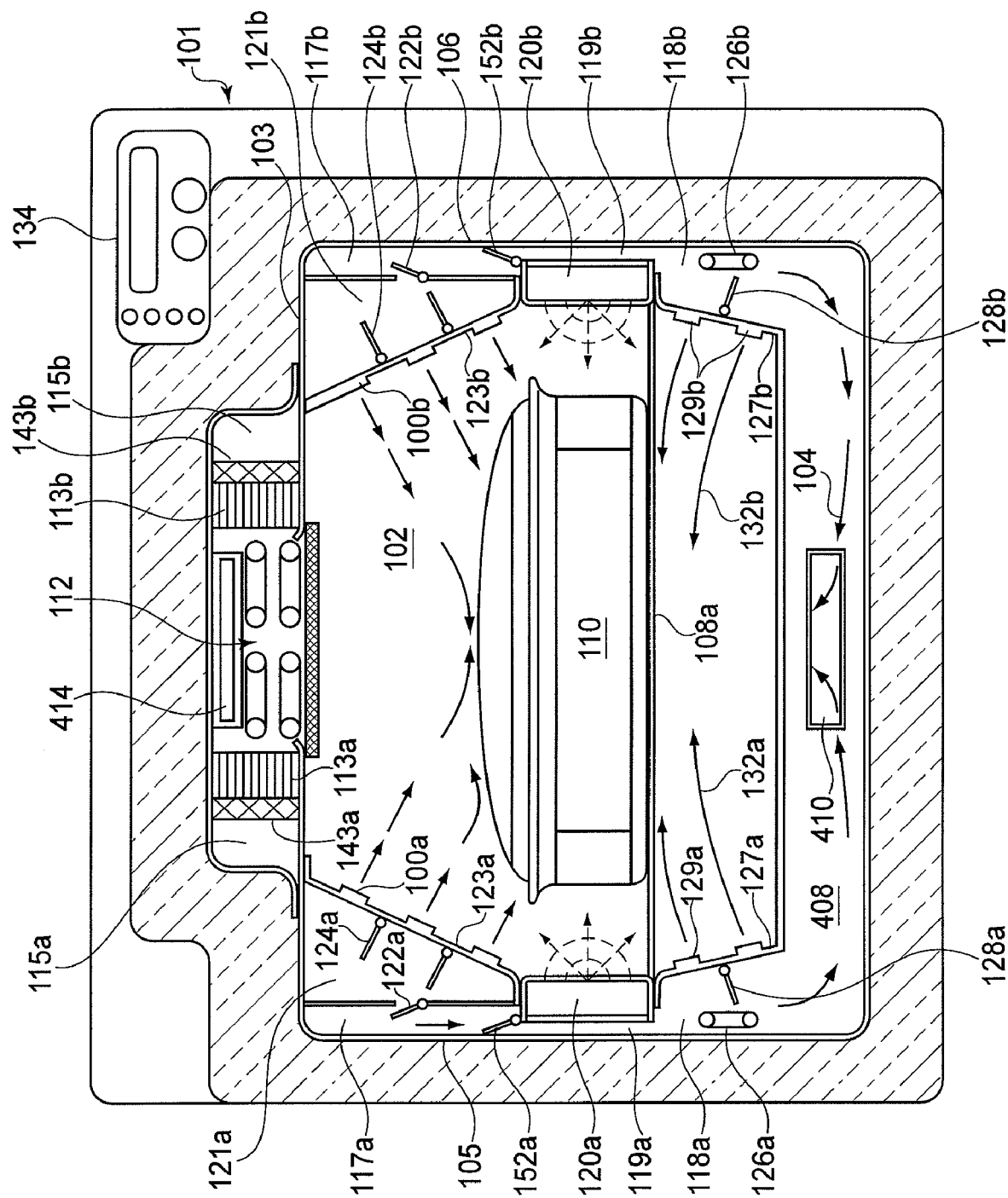
FIG. 2 is a front view with by-pass valve in the closed position.
Figure 3:
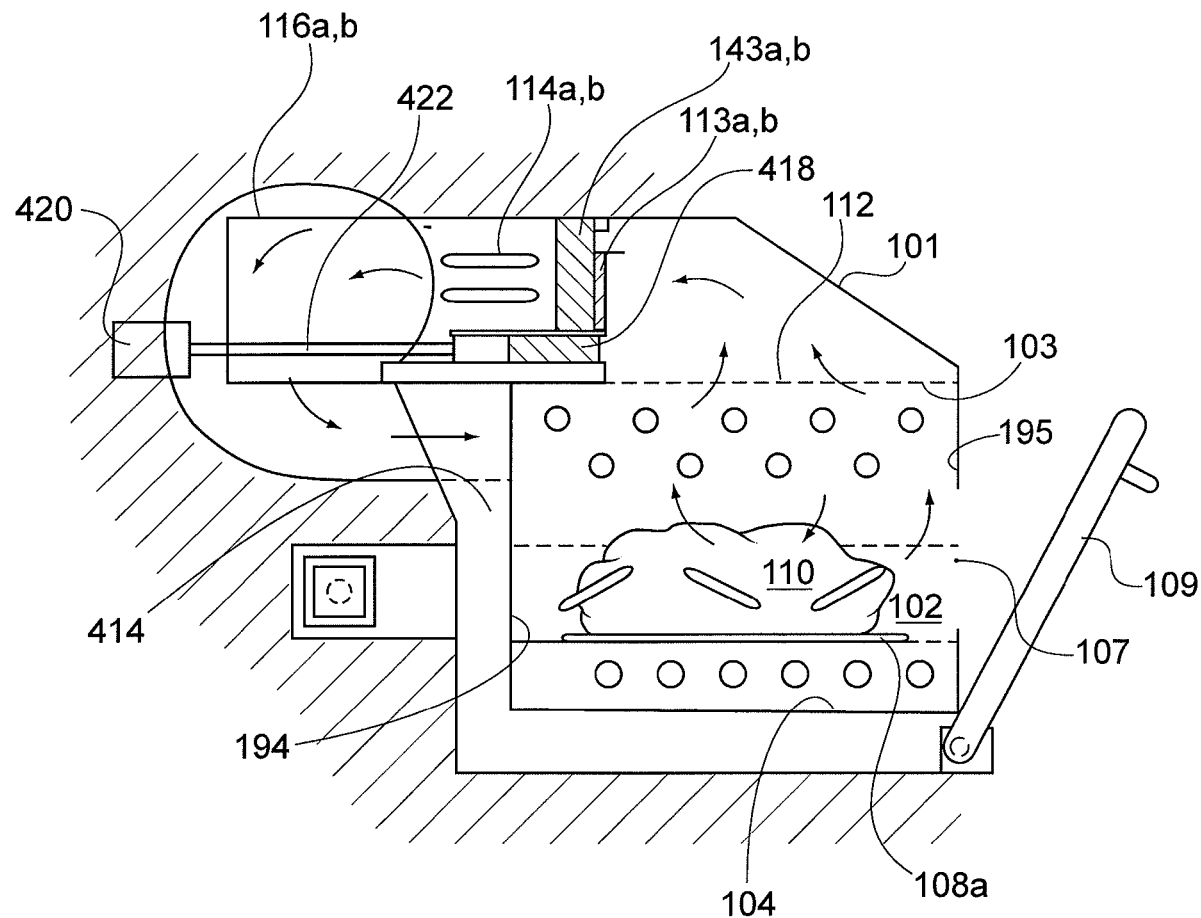
FIG. 3 is a side view with improved by-pass valve in normally open position.
Figure 4:
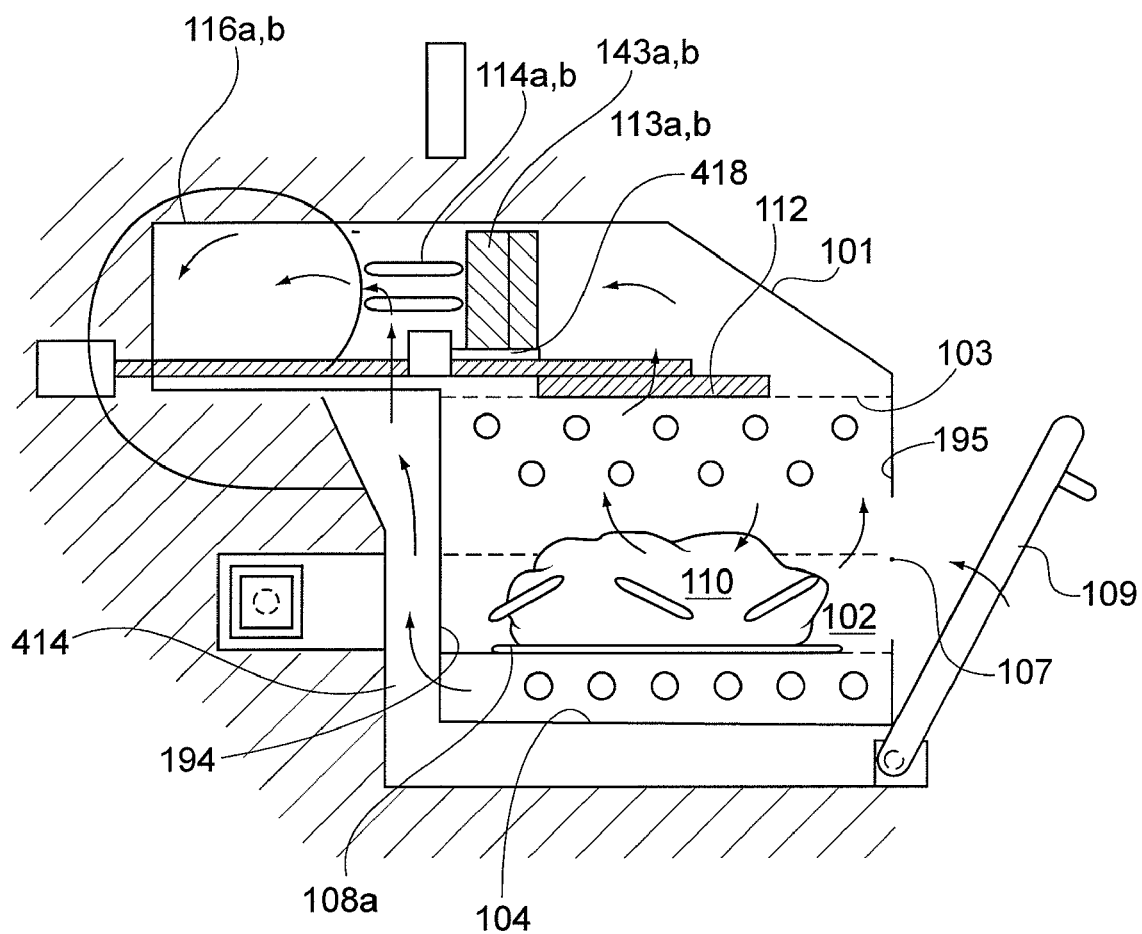
FIG. 4 is a side view with by-pass valve in the closed position.

Referring to FIGS. 1-2, the speed cooking oven is comprised of two independent gas transfer systems, described herein as a left gas transfer system and a right gas transfer system wherein left gas transfer system delivers gas to and from the left side of the oven cavity 102, and right gas transfer system delivers gas to and from the right side of the oven cavity 102. Although each gas transfer system is described separately, the systems are identical in their configuration (although is not required that they be identical) and operation and serve to distribute gas to the respective sides of oven cavity 102.

Gas is transferred to and from the left side of oven cavity 102 via a left gas transfer system, which is comprised of a left gas transfer section 115a, extending from the front to back of oven top wall 103, along the left side of top wall 103. In fluid connection with left gas transfer section 115a is top gas egress opening 112, which is open to, and in fluid connection with oven cavity 102 through top wall 103. Top gas egress opening 112 is substantially rectangular, although other geometries may be utilized, and is centrally located within oven top wall 103 and provides for the passage of gas from oven cavity 102 into left gas transfer section 115a, as gases are removed from oven cavity 102 through top egress gas egress opening 112. Located within left gas transfer section 115a is left grease extractor 113a. As gas is drawn through top gas egress opening 112, the gas passes across left heating means 114a, prior to entry in and through left grease extractor 113a. Heating means 114a may include a direct fired thermal energy source, indirect fired thermal energy, propane, natural gas, electric resistance heating elements, and other thermal means, and applicant intends to encompass within the language any structure presently existing or developed in the future that performs the same function. After the gas is drawn across left heating means 114a and through left grease extractor 113a, it is then drawn through left odor filter 143a and into left gas transfer section 115a. Alternate locations for left odor filter 143a can be utilized within the gas flow path and the location of the left odor filter 143a adjacent left grease extractor 113a is not required. In fluid connection with, and located within left gas transfer section 115a is a left gas accelerator, illustrated as left blower wheel 116a. Connected to left blower wheel 116a is a blower motor shaft, which is driven by a direct shaft from an electric motor. Other means may be employed for coupling blower wheel 116a to electric motor, such as belt drive, and the means is not limited to direct drive. Blower wheel 116a takes gas from oven cavity 102 and delivers the gas via gas transfer section 117a to the left top side of oven cavity 102. Although illustrated as a conventional blower motor, blower motor shaft and blower wheel, other gas pumping means such as a compressor may be utilized to re-circulate gas to and from oven cavity 102 and applicant intends to encompass within the language any structure presently existing or developed in the future that performs the same function. Top left gas transfer section 117a is in fluid connection with a lower left gas transfer section 118a via a left vertical gas transfer section 119a. Left vertical transfer section 119a is bounded by left side wall 105 and a left microwave waveguide section 120a.

As gas is discharged into top left gas transfer section 117a, a selected portion of said gas is directed into a top left discharge section 121a by a top left deflecting means 122a, FIG. 2 shown in the open position. Thereafter the gas is discharged through apertures located within a top left slotted or perforated discharge plate 123a. Gas is then distributed into oven cavity 102. Apertures 100a may be slotted, regularly formed or irregularly formed apertures and are illustrated herein as nozzles, 100a and 129a, to be discussed herein, and applicant intends to encompass within the language any structure presently existing or developed in the future that performs the same function as 100a, 129a and to be discussed further herein 100b and 129b. Gas is distributed through various apertures 100a located within left discharge plate 123a and delivered onto the left top and left side portions of the food product 110. As gas enters top left gas delivery section 121a, said gas may be further deflected via a top left gas deflecting means 124a as shown in FIG. 1 in the open position. Gas deflecting means 124a is pivotally attached to gas discharge plate 123a, although, other means for accomplishing said gas deflection may be utilized. For example means such as normally open, normally closed, or normally partially open and normally partially closed switched plates may be used (wherein said plates slide along the inside of perforated plate 123a to limit the aperture openings 100a of discharge plate 123a), and applicant intends to encompass within the language any structure presently existing or developed in the future that performs the same function. Gas that has not been discharged or deflected into top left gas delivery section 121a by gas deflecting means 122a flows to lower left gas transfer section 118a via vertical transfer section 119a. Pivotally attached to waveguide section 120a is a lower gas transfer deflection mechanism 152a, FIG. 1 that operates to limit the amount of gas that is transferred to lower gas transfer section 118a. As used herein, the terms "flow control means" "gas deflecting means" "transfer deflection mechanism" and "flow control means" all have the same meaning and refer to means to control gas flow within the oven. Indeed, certain speed cooking operations may call for more gas flow to the lower part of the speed cooking oven, while other operations will call for little or no gas flow to the bottom side of the oven for delivery to the bottom of the food product. In those instances where little or no gas flow is desired upon the bottom surface of the food product, gas transfer deflection mechanism 152a may be closed in order to allow all, or substantially all, of the gas flow into top left gas delivery section 121a.

Gas that flows to lower left gas delivery section 118a may be re-heated, if required, by lower left heating means 126a, FIG. 1. After passing over heating elements 126a, the gas may be further deflected by deflecting means 128a, FIG. 1, shown in the open position. As gas deflecting means 128a is rotated, directional control of the gas flow may be further refined, allowing for gas flow to pass through the upper or lower rows of apertures of lower gas plate 127a at various positions along food product 110 bottom surface, FIG. 1. Although gas deflecting means 128a is shown as pivotally attached to left slotted or perforated gas discharge plate 127a, gas deflecting means 128a is not limited to the pivotally attached means illustrated herein, and as described elsewhere herein, applicant intends to encompass within the language any structure presently existing or developed in the future that performs the same function. Apertures 100a, 100b, 129a and 129b are sized for low pressure drop, while providing and maintaining sufficient gas velocities of approximately 2000 ft/minute to approximately 7000 ft/minute to properly cook the food product, although velocities above 7000 ft/minute may be used and velocities less than 2000 ft/minute may also be utilized. As shown in FIG. 2, the apertures are adjusted such that the majority of the gas is supplied from the top left gas discharge section 121a. The resulting imbalance of gas flows between the top left gas flow 130a and lower left gas flow 132a is desirable because the top flow 130a must aggressively remove moisture produced and escaping from the top surface, and top side surface of food product 110. The imbalance also serves to heat, brown and/or heat and brown the food product 110.

Referring now to the right gas transfer system, gas is transferred to and from oven cavity 102 via a right gas transfer system, which is comprised of a right gas transfer section 115b, which extends from the front to back of oven top wall 103, along the right side of top wall 103. In fluid connection with right gas transfer section 115b is top gas egress opening 112, which is open to, and in fluid connection with oven cavity 102 through top wall 103. Located within right gas transfer section 115b is right grease extractor 113b. As gas is drawn through top gas egress opening 112, the gas passes across right heating means 114b, prior to entry in and through right grease extractor 113b. After the gas is drawn across heating means 114b and through right grease extractor 113b, it is then drawn through right odor filter 143b and into right gas transfer section 115b. Alternate locations for right odor filters 143a, 143b can be utilized within the gas flow path and the location of the right odor filter adjacent to right grease extractor 113*b* is not required. In fluid connection with, and located within right gas transfer section 115*b* is a right gas accelerator, illustrated as right blower wheel 116*b*. Connected to right blower wheel 116*b* is a blower motor shaft, which is direct drive with an electric motor. Blower wheel 116*b* takes gas from oven cavity 102 and delivers the gas via gas transfer section 117*b* to the right top side of oven cavity 102. Top right gas transfer section 117*b* is in fluid connection with a lower right gas transfer section 118*b* via a right vertical gas transfer section 119*b*. Right vertical transfer section 119*b* is bounded by right side wall 106 and a right microwave waveguide section 120*b*.

As gas is discharged into top right gas transfer section 117*b*, a selected portion of said gas is directed into a top right discharge section 121*b* by a top right deflecting means 122*b*, shown in the open position in FIG. 2. Thereafter the gas is discharged through a top right slotted or perforated discharge plate 123*b* into oven cavity 102. Slotted or perforated right discharge plate 123*b* is used to distribute gas leaving top right gas delivery section 121*b* through various apertures 100*b* into oven cavity 102 and onto the right top and side portion of the food product 110. As gas enters top right gas delivery section 121*b*, said gas may be further deflected via a top right gas deflecting means 124*b* as shown in FIG. 2. As with 124*a*, gas deflecting means 124*b* is shown as pivotally attached to slotted or perforated discharge plate 123*b*, although other means for accomplishing said gas deflection may be utilized. Gas that has not been discharged or deflected into top right gas delivery section 121*b* by gas deflecting means 122*b* flows to lower right gas transfer section 118*b* via vertical transfer section 119*b*. Pivotally attached to waveguide section 120*b* is a gas transfer deflection mechanism 152*b*, shown in the open position, FIG. 2, that operates to limit the amount of gas that is transferred to lower gas transfer section 118*b*. Again, as with the left side gas transfer system, certain speed cooking operations may call for more gas flow to the lower part of the speed cooking oven, while other operations will call for little or no gas flow to the lower part of the oven for bottom side browning of the food product. In those instances where little or no gas flow is desired upon the bottom surface of the food product, gas transfer deflection means 152*b* may be closed, or partially closed, in order to allow little or no gas flow to lower gas delivery section 118*b*.

Gas flow that that is distributed to lower right gas delivery section 118*b* may be re-heated, if required, by lower right heating means 126*b*, FIG. 2. After passing over heating elements 126*b*, which may or may not be present in every oven, depending upon the particular oven requirements, the gas may be further deflected by deflecting means 128*b*, FIG. 2, shown in the open position. As gas deflecting means 128*b* is rotated, directional control of the gas flow may be further refined, allowing for gas flow to pass through the upper or lower apertures of lower gas plate 127*b* at various positions along food product 110 bottom surface. Apertures 100*b* and 129*b* are sized for low pressure drop, while providing and maintaining sufficient gas velocities of approximately 2000 ft/min to approximately 7000 ft./minute to properly cook the food product although as with other oven functions, gas flows above 7000 ft/minute and lower than 2000 ft/minute may be utilized as needed. Again, as shown in FIG. 2, the top apertures are adjusted such that the majority of the gas is supplied from the top right gas discharge section 121*b*.

As gas flow 130*a* is directed toward the center of oven cavity 102 from the left side and gas flow 130*b* is directed toward the center of oven cavity 102 from the right side, the gas flows meet upon the surface of the food product and turbulently mix, conflict and collide, thereby causing high heat transfer and rapid cooking of the food product. This turbulently mixed gas flow directed at the food product can best be described as glancing, conflicting and colliding gas flow patterns that spatially average the gas flow over the surface area of the food product producing high heat transfer and moisture removal rates at the food surface, thereby optimizing speed cooking. The gas flow is directed towards the top, the bottom and the sides of the food product from the left and right sides of the oven cavity and the left and right side gas flows conflict, collide and glance off each other at the food product surface before exiting the oven cavity through top gas egress opening. As used herein the term "mixing" refers to the glancing, conflicting and colliding gas flow patterns that meet at and upon the top surface, the bottom surface and the left and right side surfaces of the food product and produce high heat transfer and speed cooking of the food product due to spatial averaging of the gas flow heat transfer. As used herein, the terms "mix", "mixing", "turbulent mix" and "turbulent mixing". The same mixing of gas flow occurs upon the lower surface and lower side surfaces of food product 110 by lower gas flows 132*a* and 132*b*, FIG. 1.

In those instances wherein directional control of the gas flow is desired, gas deflecting means 122*a*, 122*b*, 124*a*, 124*b*, 128*a*, 128*b* and 152*a* and 152*b*, may be rotated such that gas flow is diverted to selected apertures, thereby effecting a different gas flow pattern and gas mixing upon the food product surface. Additionally, in those instances wherein no bottom side gas flow is desired, gas deflecting means 152*a*, 152*b* may be closed, thereby allowing for little or no passage of gas flow to the lower portion of the oven cavity. Various other adjustments of gas deflecting means 122*a*, 122*b*, 124*a*, 124*a*, 128*a*, 128*b*, 152*a*, 152*b* are possible and applicant intends to encompass within the language any structure presently existing or developed in the future that allows for combinations of open and closed positions by the various gas flow control means. Gas deflecting (flow control) means 122*a*, 122*b*, 124*a*, 124*b*, 128*a*, 128*b*, 152*a* and 152*b* may be manually controlled, automatically controlled via controller 134 or some combination of automatic and manual control and applicant intends to encompass within the language any structure presently existing or developed in the future that performs the function described herein concerning adjustment of the gas deflecting means.

The gas flows within the oven, as well as other functions of cooking appliance are directed by controller 314, FIG. 1. Controller 134 determines, among other things, the velocity of gas flow, which may be constant or varied, or, may be constantly changed throughout the cooking cycle. It may be desired to cook the food product on one velocity throughout the entire cooking cycle, or to vary the gas velocity depending upon conditions such as a pre-determined cooking algorithm, or vary the velocity in response to various sensors that may be placed within the oven cavity, oven return air paths or various other positions within the oven. The location and placement of said sensors will be determined by the particular application of the oven. Additionally, other means may be utilized wherein data is transmitted back to controller 134, and thereafter controller 134 adjusts the cooking in an appropriate manner. For example sensors (temperature, humidity, velocity, vision and airborne chemical mixture level sensors) may be utilized to constantly monitor the cooking conditions and adjust the gas flow accordingly within a cooking cycle, and other sensors not described herein may also be utilized. The speed cooking oven may utilize sensors that are not currently commercially utilized (such as laser, non-invasive temperature sensors and other sensors that are currently too expensive to be commercially feasible), and the speed cooking oven is not limited to those discussed herein, as many sensing devices are known and utilized in the cooking art.

The most efficient utilization of the spent hot gas is by re-circulation of the gas flow through the oven cavity many times during a cooking cycle. During normal speed cooking it may be desirable for one food product to be cooked after another different type of food product (fish followed by pastry) with successive cycles continuing. For example shrimp may be cooked first, followed by a baked product or pastry. Without appropriate filtration, the odors from the shrimp will contaminate the baked product, producing an undesirable taste and odor in the pastry. There exists a need for further air clean-up (in addition to the grease extractors) to further scrub the gas flow of the particles that are not entrained by grease extractors 113a and 113b. In instances wherein further filtration of the gas flow is desired, odor filters may be placed within the oven cavity. FIG. 2 illustrates the use of odor filters 143a and 143b for this purpose. Left side odor filter 143a is attached within top left gas transfer section 117a, downstream of left grease extractor 113a and right odor filter 143b is attached within right gas transfer section 117b downstream of right grease extractor 113b. Odor filters 143a and 143b are attached in a manner that allows for their easy removal for cleaning and replacement. Gas that flows into the left and right gas transfer systems 115a and 115b first passes through odor filters 143a and 143b. The gas flow is therefore further scrubbed after passage through grease extractors 113a and 13b in order to eliminate odors that could interfere with the proper taste of the food product currently being cooked. In some cases it may be beneficial to utilize a second set of odor filters, and these filters may be placed anywhere within the gas flow path of blower wheels 116a and 116b. Odor filers 143a, 143b may be catalytic type elements or other filtration means including, but not limited to activated charcoal, zeolite or ultra violet waveligt light. It is beneficial that the odor filters be comprised of a material, or materials, that effectively scrubs, or cleans the gas flow with a minimal amount of interference with the gas flow velocities. Additionally, it is beneficial that the odor filters be easily removed, easily cleaned and inexpensive for the operator to replace.

During the cooking process it may be desirable to maintain oven cavity temperature at a constant level without the introduction of gas into oven cavity 102. For example, the operator may be cooking a delicate pastry and may desire to finish food product 110 with no gas flow. This may be accomplished with a radiant only mode utilizing an improved gas by-pass system wherein gas flow is not allowed to enter oven cavity 102, but is directed to a lower gas chamber 408, FIG. 2 for by-pass circulation to and from heaters 114a, 114b via conduit 414, FIG. 4. Appliance 101 includes lower gas egress opening 410, conduit 414 (FIG. 4), movable door 418 and actuator 420. In the open position, movable door 418, FIGS. 1, 3, allows gas to circulate in a normal mode for speed cooking. In this instance a single door 418 blocks the passage of gas through conduit 414, thereby forcing all, or substantially all of the gas flow through grease extractors 113 a, 113b, odor filters 143a, 143b and across heaters 114a, 114b before returning to blower wheels 116a, 116b.

During the radiant cooking mode movable door 418 is closed by actuator 420 and worm gear 422 thereby blocking, or partially blocking, top gas egress opening 112. Gas flow is diverted into lower gas egress opening 410, through conduit 414, FIG. 4 and across heaters 114a, 114b before returning to blower wheels 116a, 116b. Gas flow in this mode does not pass through top egress opening 112 and does not return to oven cooking cavity 102. Depending upon the type of construction, quality of materials and oven specifications, small amounts of gas may leak through door 418 and into cavity 102. Although door 418 is graphically depicted and described as movable door and worm gear, many methods may be employed to limit and allow gas to pass from lower chamber 408, through conduit 414 and return to blower motors 116a, 116b, and applicant intends to encompass within the language any structure presently existing or developed in the future that performs the same function as mechanism 420, 418 422.

Radiant mode allows the operator to maintain gas flow at a constant temperature, increase or decrease the temperature of the gas flow without affecting the food product currently being cooked. For example, an operator may currently cooking a food product at a selected temperature but desire to cook the next food product at a higher or lower temperature. In these instances, radiant mode may be utilized and gas flow partially or completely limited oven cavity 102. The gas bypasses around oven cavity 102 but does not, or may not, directly impact the food product, thereby allowing the operator to increase or decrease the temperature of the gas flow and the temperature of the previously described cavity walls. In this manner, the operator gains additional flexibility.

The invention allows for gas flow blockage and diversion with the use of a single movable door that selectively blocks, partially blocks or substantially blocks gas flow through conduit 414 and egress opening 112.

While the exemplary embodiments of the present invention have been shown and described, it will be understood that various changes and modifications to the foregoing embodiments may become apparent to those skilled in the art without departing from the spirit and scope of the present invention. Accordingly, the invention is not limited to the embodiments disclosed, but rather by the appended claims and their equivalents.

The invention claimed is:

1. An oven for cooking a food product by hot gas, comprising:
   a housing;
   a cooking chamber disposed within the housing;
   a thermal means for heating the gas;
   a gas circulating chamber disposed between the housing and the cooking chamber;
   a flow means for circulating the gas through the gas circulating chamber, over the thermal means, through the cooking chamber, and back through the gas circulating chamber; and
   a bypass system for reducing the flow of gas into the cooking chamber, the bypass system comprising:
   a recirculation aperture disposed in a wall of the gas circulation chamber;
   a conduit extending from the recirculation aperture to the flow means;
   a bypass aperture disposed in a wall of the cooking chamber;
   a single bypass door; and
   an actuator for selectively actuating the bypass door;
   wherein the bypass door is operable between a non-bypass mode in which the bypass door seals the conduit, thereby allowing the gas to flow from the cooking chamber to the flow means, and thereby preventing the gas from flowing from the gas circulating chamber to the flow means; and a bypass mode in which the bypass door seals the bypass aperture, thereby allowing the gas to flow from the gas circulating chamber to the flow means, and thereby preventing the gas from flowing from the cooking chamber to the flow means.

2. The oven according to claim 1, wherein the actuator is a worm gear.

3. The oven according to claim 1, wherein the bypass door is sliding door.

4. The oven according to claim 1, wherein the cooking chamber is radiantly heated by the hot gas flowing through the gas circulating chamber when the bypass system is in the bypass mode.

5. The oven according to claim 1, wherein the bypass door is adjacent the thermal means.

6. The oven according to claim 1, wherein the recirculation aperture is disposed in a lower portion of a back wall of the gas circulating chamber, and the bypass door is disposed in a top wall of the cooking chamber.

7. The oven according to claim 1, further comprising:
a control system for selectively activating the bypass system.

8. The oven according to claim 1, further comprising:
a control system for activating the bypass system according to a preprogrammed schedule.

9. The oven according to claim 1, further comprising:
a microwave cooking subsystem for sending microwave energy into the cooking chamber.

10. The oven according to claim 1, further comprising:
a speed cooking subsystem for speed cooking the food product.

11. The oven according to claim 1, wherein the flow of gas over the thermal means is sufficient to prevent overheating of the thermal means when the bypass system is in the bypass mode.

* * * * *